Figure 1:
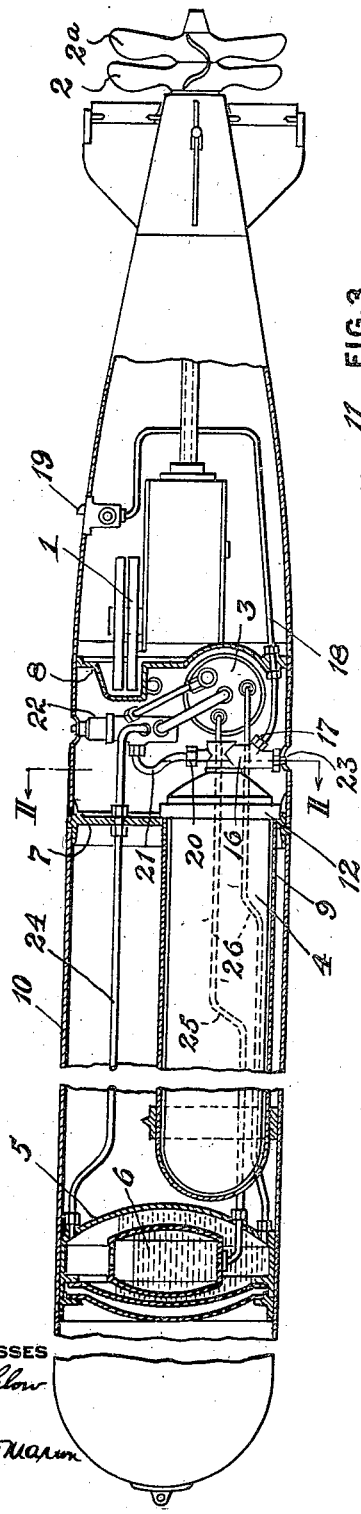

H. W. SHONNARD.
TORPEDO CONSTRUCTION.
APPLICATION FILED AUG. 31, 1914.

1,181,548.

Patented May 2, 1916.

WITNESSES
Paul M Critchlow
Frank J Donovan

INVENTOR
Harold W. Shonnard
by Christy and Christy
Atty's

UNITED STATES PATENT OFFICE.

HAROLD W. SHONNARD, OF FAR ROCKAWAY, NEW YORK, ASSIGNOR TO CRUCIBLE STEEL COMPANY OF AMERICA, OF PITTSBURGH, PENNSYLVANIA, A CORPORATION OF NEW JERSEY.

TORPEDO CONSTRUCTION.

1,181,548.   Specification of Letters Patent.   Patented May 2, 1916.

Application filed August 31, 1914. Serial No. 859,421.

*To all whom it may concern:*

Be it known that I, HAROLD W. SHONNARD, residing at Far Rockaway, in the county of Queens and State of New York, a citizen of the United States, have invented or discovered certain new and useful Improvements in Torpedo Construction, of which improvements the following is a specification.

Automobile torpedoes, as usually constructed, comprise in part, a compressed air flask, the outer side walls of which form the central portion of the torpedo shell or body, the head and the after body of the torpedo being secured to the fore and aft ends, respectively, of such flask. During the running of the torpedo the compressed air flows from the flask to a heater, in which a fluid fuel is burned, and into which water is injected, resulting in the generation of steam. The steam, the products of combustion and the heated nitrogen and other inert gases of the compressed air then flow to the propelling engine.

For various reasons the use of compressed air as an element in the generation of motive fluid is objectionable. In the first place, the requirements of speed and range make it necessary to employ a large volume of compressed air under a very high pressure to supply a sufficient amount of oxygen for supporting combustion. Because of this it follows that the air storage flask must, in a practical construction, be a part of the torpedo body; and because the weight of a torpedo must not exceed the weight of water displaced thereby, the flask must be of very light construction. This necessitates the use of expensive and accurately machined high resistance material of complicated design, resulting in a very low factor of safety, which has caused to be established the practice, except in actual warfare, of charging the air flask after the torpedo has been placed within the launching tube and just before launching. When in action, the hazard of handling the charged torpedo and the possibility of it being struck by a shot is necessarily ignored. Furthermore, in order to charge torpedoes with compressed air aboard ship in a reasonable length of time requires large and complicated compressors and other apparatus which occupy valuable space, especially in the case of the smaller ships, such as destroyers and submarines.

It is the object of the present invention to overcome these objectionable features of torpedo construction. In attaining this object, free oxygen is used to support the combustion of the fuel rather than the oxygen of compressed air. This, however, is not broadly new. The invention consists rather in the modification of the torpedo structure so that the use of free oxygen will contribute to the desired end.

It will of course be understood that, to effect the combustion of a given quantity of fuel, a much smaller quantity of stored compressed gas is required when such gas is free oxygen than when air. Accordingly, in the practice of my invention the oxygen is stored in removable or portable tanks, which instead of forming an integral and large part of the torpedo body, are detachably mounted within the shell. By such an arrangement, the oxygen tanks, being relatively small and light in weight as compared to the usual compressed air flasks, may be charged at any desired time, as, for example, at a shore station, and distributed to the ships as are other stores, and there placed within the respective torpedoes. My invention provides means whereby the oxygen tanks may be quickly inserted within the torpedo body, and with a minimum amount of care and labor, as will presently be described in detail.

Another and important advantage of my construction is that, owing to the elimination of the usual air flask and the substitution in practical form of a removable oxygen tank, it is possible to obtain a very uniform fore and aft distribution of the torpedo mechanism with respect to the weight thereof and very materially increase the buoyancy of the torpedo; since the usual heavy ballast weights required for trimming the torpedo fore and aft may be considerably reduced. In other words, whereas heretofore all of the driving and steering mechanism, including liquid storage tanks, have necessarily been placed aft of the flask, I can place such mechanism to the fore thereof as will render the usual heavy ballast weights largely unnecessary.

The accompanying sheet of drawings, which forms part of the specification, illustrates the preferred embodiment of the invention.

Figure 3:
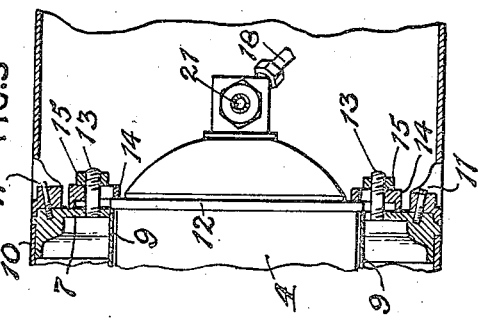
Figure 2:
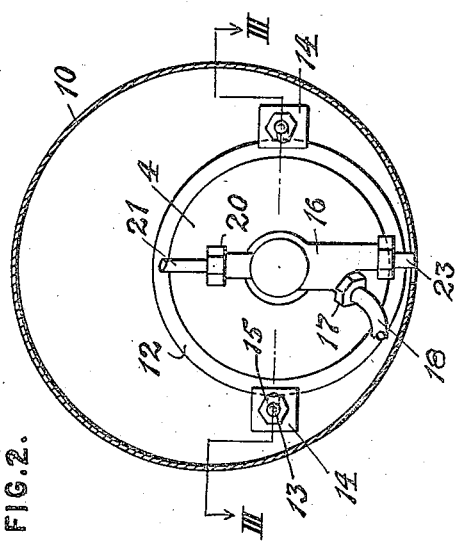

Figure 1 is a longitudinal sectional elevation showing the general arrangement of the driving mechanism and fluid storage reservoirs; Fig. 2 is a transverse sectional view to enlarged scale, taken on the line II—II, Fig. 1; and Fig. 3 a sectional view taken on the broken line III—III Fig. 2.

In the several figures like numerals are used to designate like parts.

Referring to the drawings, the torpedo, so far as its general arrangement is concerned, may be driven by a two-rotor turbine 1, which, through suitably interposed reduction gears, drives tandem propellers 2 and 2ª in opposite directions. The motive fluid for the turbine is generated in a heater 3 into which is introduced oxygen from a tank 4, and water and fuel from tanks 5 and 6, respectively, placed in the fore part of the torpedo. This disposition of the liquid containing tanks is made possible through the elimination of the usual air flask and the substitution, in practical form, of the portable oxygen tank. As will readily be seen, a more even distribution of the fore and aft weight of the torpedo may be thus effected.

While any suitable arrangement may be used for mounting and connecting the portable oxygen tank within the shell, it is desirable to provide a construction wherein it will be unnecessary to close any water-tight joints before launching the torpedo and after the oxygen tank has been placed therein, otherwise undue time and care would be required to make ready for a shot. For this reason, in my preferred construction, the oxygen tank lies within a casing having one end opening to a compartment accessible to the sea.

Referring again to the illustrated embodiment of my invention, an open compartment is formed between transverse bulkheads 7 and 8, the former of which is provided with an opening, to the margin of which the open end of a tank-containing casing 9 is secured by a water-tight joint. The torpedo-shell 10 is separable at the open compartment thus formed, preferably in the general plane of the bulkhead 7, the two sections of the shell being detachably connected to each other in the usual manner by means of joint screws 11. The casing, as will be seen, is slightly larger than the outside dimensions of the tank 4, which is provided at one end with a flange 12 adapted to abut against the bulkhead 7 at the edge of the opening therethrough. Suitable clamps are provided to hold the tank 4 in place, each consisting preferably of a threaded stud 13 extending from the bulkhead 7, a slotted block 14, and a nut 15. The head of the tank 4 is provided with a starting valve 16 which may be connected by means of a suitable union joint 17 to a pipe 18 leading to a starting trigger 19, the operation of which is well understood by those skilled in the art. The starting valve is also connected by a second union 20 to a pipe 21 leading to a reducing valve 22, and the flow of oxygen from the tank 4 to the starting valve may be controlled by means of a valve 23.

It will be observed that, by such an arrangement as just described, a fully charged tank of oxygen may be placed in the torpedo in a very short space of time, it being only necessary, after the tank has been slipped into the casing 9, to tighten the nuts 15, couple the unions 17 and 20, open the valve 23, and drive the joint screws 11, all of which operations may be done without the necessity of exercising skill or great care. When the torpedo is launched, water will of course occupy the space between the bulkheads 7 and 8, and may, without prejudicially affecting the balance of the torpedo, enter the relatively small space between the adjacent walls of the tank 4 and casing 9.

It has been found necessary, in the actual construction of torpedoes of the general type shown herein, to provide ballast weights to keep the longitudinal center of gravity materially below the axis of the torpedo. By dispensing with the usual heavy air flask, which has an equal distribution of weight, and placing the oxygen tank in the lower part of the torpedo so that the center of gravity of the tank is substantially below the torpedo axis, these ballast weights may be eliminated to a larger extent and the total weight of the torpedo structure correspondingly diminished.

The fuel and water may be fed to the heater 3 in any suitable or well known manner. As shown herein, the pressure of the oxygen is applied to the upper surfaces of the fuel and water by means of a pipe 24 leading from the reducing valve, and pipes 25 and 26 lead from the fuel tank 6 and water tank 5, respectively, to the heater.

From the foregoing description, the structural and operating advantages of my improvements are apparent. While I have shown but one embodiment of my invention, it will be understood that various modifications may be made without departing from the spirit thereof.

I claim as my invention:

1. In an automobile torpedo, the combination of a shell, fluid pressure means for driving the torpedo, a compartment within the shell open to the sea and including a tank-receiving casing, said shell being separable at said compartment, means for securing the tank to the torpedo, and means for placing the tank in communication with the driving mechanism.

2. In an automobile torpedo, the combination of a shell, fluid pressure operated means for driving the torpedo, a pair of bulkheads forming between them a compartment open to the sea, said shell being separable at a point between the bulkheads, one of said bulkheads being provided with an opening, a water-tight casing communicating with and extending from said opening, and a pressure fluid tank removably secured within said casing.

3. In an automobile torpedo, the combination of a shell, fluid pressure operated means for driving the torpedo, a pair of bulkheads forming between them a compartment open to the sea, the forward of said bulkheads being provided with an opening, a tank-receiving casing having an open end secured to the margin of said bulkhead opening, and extending forwardly thereof, and means for separating said shell in the plane of said forward bulkhead.

4. In an automobile torpedo, the combination of a shell fluid pressure operated means for driving the torpedo, a pair of bulkheads forming between them a compartment open to the sea, the forward of said bulkheads being provided with an opening, an elongate tank-receiving casing having an open end secured to the margin of said bulkhead openings, a fluid pressure tank within said casing and provided with a flange abutting against the forward bulkhead, and a pair of clamps engaging said bulkhead and flange.

In testimony whereof I have hereunto set my hand.

HAROLD W. SHONNARD.

Witnesses:
JAMES F. DUFFY,
EMMA B. WEISMAN.

Copies of this patent may be obtained for five cents each, by addressing the "Commissioner of Patents, Washington, D. C."